May 24, 1927.
J. E. SMITH
1,630,237
ELECTRIC COOKER
Filed Oct. 22, 1926    2 Sheets-Sheet 1
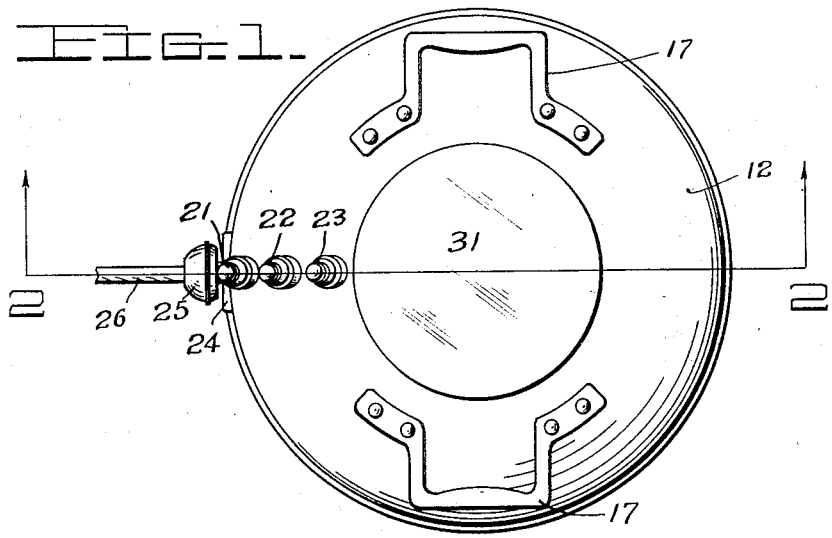
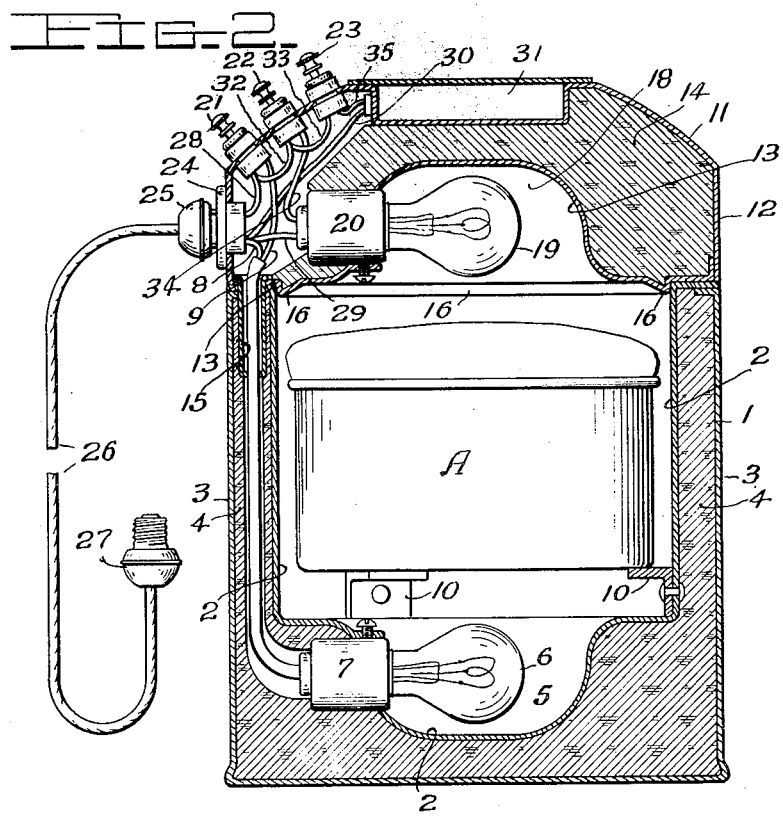
Inventor
J. E. Smith May 24, 1927.
J. E. SMITH
1,630,237
ELECTRIC COOKER
Filed Oct. 22, 1926
2 Sheets-Sheet 2
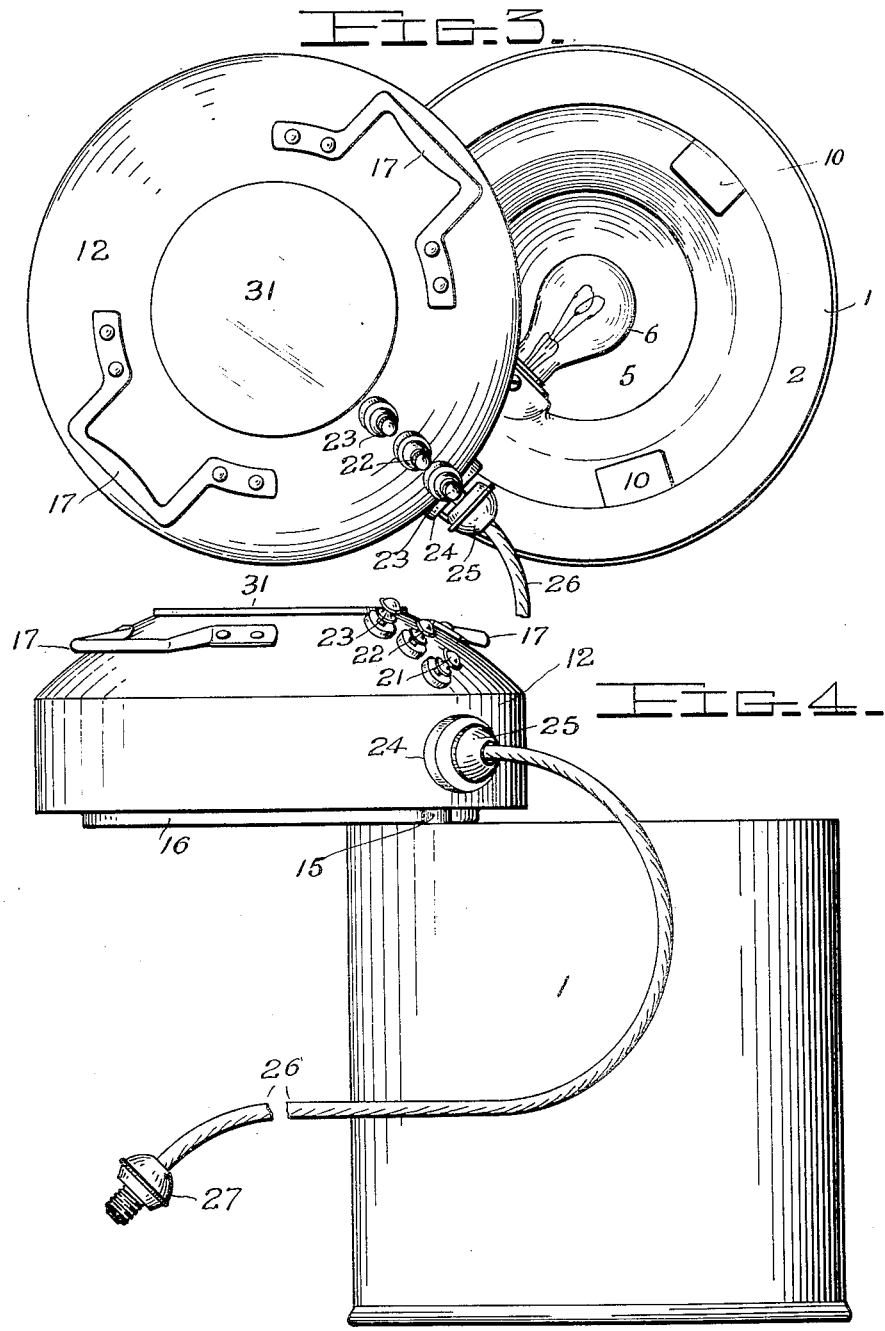
Inventor
J. E. Smith
by
Attorney Patented May 24, 1927.

1,630,237

UNITED STATES PATENT OFFICE.

JOHN E. SMITH, OF EAST ORANGE, NEW JERSEY, ASSIGNOR TO THE LITE-RAYS COOKER CORPORATION, OF PLAINFIELD, NEW JERSEY, A CORPORATION OF NEW JERSEY.

ELECTRIC COOKER.

Application filed October 22, 1926. Serial No. 143,311.

This invention relates to cooking devices, but more particularly has reference to a simple and economical device that bakes, roasts, toasts and stews, by a heating agent consisting of ordinary electric light bulbs located on opposite sides of the utensil that contains or supports the substance or article that is to be cooked.

Heretofore in structures of this description the bulbs have been located on opposite sides of the substance or article to be cooked, but the upper bulb has been fixed to the body portion of the cooker and the consequence was that when it became necessary to remove the article or substance cooked, it was necessary to remove the bulb, and since the latter was exceedingly hot and remained so for some little time, it was a matter of great inconvenience to remove this bulb, and frequently it was necessary, after the removal of the cooked article or substance, to substitute another article or substance to be cooked, and it was highly important not to allow the heating chamber to become materially cooled as would be the case if time were consumed in waiting for the bulb to become cooled.

The present cooking device overcomes this disadvantage, and will be best understood from the following description, which is to be taken in connection with the accompanying drawings which are to be read in connection with the description and in which—

Figure 1 is a plan view of the improved cooker.

Figure 2 is a section at the line 2—2 of Figure 1.

Figure 3 is a plan view with the cover partially opened, and

Figure 4 is a side elevation of the cooker with the parts in the position as they are shown in Figure 3.

Similar numerals of reference denote like parts in the several figures of the drawing.

1 is the main body portion of the cooker, which comprises an inner casing 2 and an outer casing 3, the space between these casings being filled with any suitable heat insulating material 4. These casings form the bottom and side portions of the device, and the inner casing 2 is made of any suitable metal that will reflect the rays from the bulbs.

The inner bottom portion of the body 1 is depressed so as to form a recess 5 within which is wholly contained the lower bulb 6 secured to the socket 7 that is suitably fixed within the body of the cooker, and from this socket extend the usual conductors 8, 9, which are utilized in the manner presently to be explained.

Within the interior of the body 1 and fixed to the inner casing 2 are suitable supports 10 for the cooking utensils, and while these supports are advantageous, any other ordinary supports fixed or removable may be employed, the mere matter of supporting the substance or article to be cooked being no part of this invention.

11 is the cover which is formed by an outer metal casing 12 and an inner metal casing 13, the space between these casings being filled with any suitable heat insulating material 14.

Secured to one edge of the casing 2 is a hollow pintle 15 which extends freely within the upper edge of the body 1 and this casing is formed into a circumferential lip 16 which fits snugly within the top of the body when the cover is closed, as clearly shown at Figure 2, and the top of the cover is provided with any suitable handles 17 by means of which the cover may be lifted until this lip is clear of the body 1 and the cover is then swung around to open position, the hollow pintle 15 acting as a pivot.

The inner face of this cover 11 has formed therein a recess 18 within which is wholly contained the upper bulb 19 which latter is secured within a socket 20 suitably fixed to the cover.

21, 22, and 23, are ordinary switches that are secured to the cover. 24 is an ordinary plug socket secured to the cover and 25 is the plug that may be inserted within or removed therefrom, and from this plug extends the usual conductor 26 which is to be connected with the source of electricity.

The conductor 8 is connected with one terminal of the socket 24 and the conductor 9 is connected to one terminal of the switch 21, while the other terminals of the socket 24 and switch 21 are connected by the conductor 28 so that it will be clear that when the switch 21 is operated to connect its terminals the bulb 6 will be lighted.

One conductor 29 from the socket 20, one conductor 8 from the socket 7, and the conductor 30 are all connected with one terminal of the socket 24, the conductor 30 leading into and connected with one terminal of any suitable electric stove 31 that is secured within the top of the cover.

The terminal of the switch 21 to which the conductor 28 is connected, is connected with one terminal of each of the switches 22, 23, by means of the wires 32, 33, and the other terminals of these switches 22, 23, are connected with the other conductors 34, 35, respectively, from the socket 20 and stove 31.

From the above description it will be clear that the bulbs may be lighted separately and that the heating units within the stove may likewise be separately energized, or all three or any two of them may be lighted or energized simultaneously, this being brought about merely by the operation of the switches.

Of course, the electric stove in the top of the cover may or may not be utilized, but it is extremely useful.

The enclosing of the bulbs within the recessed portions in the body of the cooker and in the cover gives the device a greater capacity without materially increasing the radiating surface of the cooker, and when the cover is lifted and swung to one side the bulb 19 is entirely out of the way and the cooked substance or article may be removed, and other articles or substances to be cooked substituted with no trouble whatsoever and this may be accomplished without even any disconnection from the source of electricity.

As an example, A denotes any suitable utensil containing a substance to be baked and mounted on the supports 10.

As above stated, the cover may be removed by merely lifting it and swinging it to one side and the electric connections need not be disturbed unless desired, and the lip 16 depending from the cover, while not absolutely necessary, is advisable since it effectively seals the cover and the body and also prevents the cover from being accidentally displaced.

Also, in case it is desired to subject the upper or lower portions of the substance or article to be cooked to different temperatures, or to suspend the cooking on one surface, this may readily be brought about by the manipulation of the switches 21, 22.

The stove 31 may be utilized for warming dishes or for boiling purposes.

What is claimed is:—

1. In a cooker, a body having an interior concave depression in the bottom thereof, a removable cover for the body having an interior concave depression in the under face thereof, electric bulbs disposed in the depressions in the body and cover and spaced from the outer edges thereof, and a reflector within the body and in the depressions whereby the food to be cooked will be acted upon by the direct and actinic rays from the electric bulbs.

2. In a cooker, a body having an interior concave depression in the bottom thereof, a cover for the body having an interior concave depression in its under face, said cover and bottom of the body having lateral socket extensions, electric bulbs in the depressions having their sockets disposed in the socket extension of the depressions, a reflecting lining for the inner walls of the body extending into and over the depressions whereby the food to be cooked will be acted upon by the direct and actinic rays from the electric bulbs, and means extending through the lining and engageable with the bulb sockets to hold the latter in the said socket extensions.

3. In a cooker, a body having an interior depression in the bottom thereof, the outer edges of said depression being spaced from the sides of the body to provide a receptacle supporting flange, a laterally swinging cover for the body having a downwardly facing depression, an electric bulb disposed in the first named depression and below the supporting flange, an electric bulb disposed in the second named depression and spaced from the outer edge thereof to permit the bulb to pass freely over the upper edge of the body when the cover is removed, and a reflector for the interior of the body and depressions whereby food placed in the cooker will be acted upon by the direct and actinic rays from the bulbs.

4. In a cooker, a body having an interior concave depression in the bottom thereof, a cover for the body having an interior concave depression in its under face, said cover and bottom of the body having lateral socket extensions, said body having a vertical passage therein connecting the socket extensions of the cover and body, electric bulbs in the depressions having sockets disposed in the socket extension of the depressions, a reflecting lining for the inner walls of the body extending into and over the depressions whereby the food to be cooked will be acted upon by the direct and actinic rays from the bulbs, means extending through the lining and engageable with the bulb sockets to hold the latter in the said socket extensions, and an electric conduit in said passage connecting the electric bulbs.

5. In a cooker, a body having an interior concave depression in the bottom thereof, a pivoted cover for the body having an annular depending lip adapted to be received in the body when the cover is closed, said cover further having an interior concave depression in its under face, said cover and bottom of the body having lateral socket extensions extending from said depression, said body further having a vertical passage connecting the socket extensions of the cover and body, a depending tubular pivot member secured to the under face of said cover and disposed within said passage and adapted for vertical movement therein, electric bulbs in the depressions having sockets disposed in the socket extensions of the depressions, a reflecting lining for the inner walls of the body extending into and over the depressions whereby the food to be cooked will be acted upon by the direct and actinic rays from the bulbs, means extending through the lining and engageable with the bulb sockets to hold the latter in the said socket extensions, and an electric conduit disposed in said passage and in said tubular pivot member and connecting the electric bulbs.

6. In a cooker, a body having bottom and side walls, a vertically movable and laterally swinging cover for the body having an annular depending lip adapted to be received in the body when the cover is closed, said body having a vertical passage in a side wall thereof, a depending tubular pivot member secured to the under face of said cover and extending in said passage and adapted for vertical movement therein, electric bulbs connected to the cover and bottom of the body, and an electric conduit disposed in said passage and said tubular pivot member and connecting the electric bulbs.

In testimony whereof I affix my signature hereto.

JOHN E. SMITH.